April 7, 1925. 1,532,272

T. H. SPENCE

COMBINED HOT AND COLD WATER FAUCET

Filed Aug. 11, 1924

INVENTOR,
THOS. H. SPENCE,
BY
Horace Barnes,
ATTORNEY

Patented Apr. 7, 1925.

1,532,272

UNITED STATES PATENT OFFICE.

THOMAS H. SPENCE, OF SEATTLE, WASHINGTON, ASSIGNOR TO SAMUEL M. GROSS, OF CLEVELAND, OHIO.

COMBINED HOT AND COLD WATER FAUCET.

Application filed August 11, 1924. Serial No. 731,316.

*To all whom it may concern:*

Be it known that I, THOMAS H. SPENCE, a citizen of the United States, residing at Seattle, in the county of King and State of Washington have invented certain new and useful Improvements in Combined Hot and Cold Water Faucets, and hereby declare that the following is a full, clear, and exact description of the same.

This invention relates to improvements in water faucets and similar fixtures.

One of the principal objects of the invention is the provision of a simple and efficient faucet for domestic use with fixtures using hot and cold water whereby both the hot and cold water may be delivered from the single faucet in proportions of each desired or either cold or hot water may be drawn independently.

A feature of the invention is to provide simple and reliable means to prevent leakage from the valve-stem without the employment of a packing gland or similar device.

A still further object of the invention is the provision of means whereby the water pressures upon the rotary valve member are equalized upon its opposite sides and also in its seating direction whereby the wear upon the valve will be minimized and take place uniformly.

The invention consists in the novel construction, adaptation and combination of a water faucet as will be hereinafter described in the following specifications, illustrated in the accompanying drawings, and finally set forth in the appended claims.

In said drawings Figure 1 is a view in side elevation of a faucet of my invention illustrated in connection with a fragmentary sectional view of a porcelain lavatory fixture.

Figure 2:
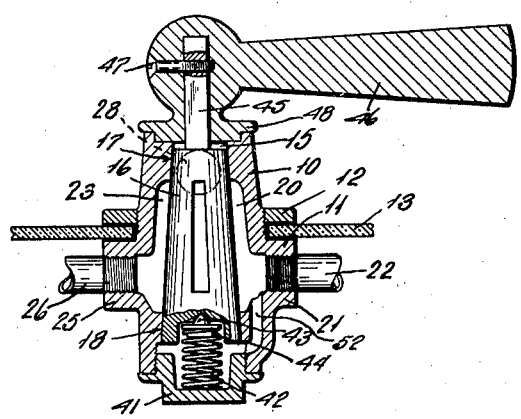
Fig. 2 is a view in horizontal section of my improved faucet, partly broken away.

Referring to said views, in which the like reference characters denote like parts throughout the several views, the reference numeral 10 designates a cylindrical faucet body having a circular exterior flange 11 and provided with screw-threads thereabove for engagement with a nut 12 between which and the flange 11 the faucet may be secured to the lavatory or other fixture 13. Interiorly of the faucet a valve-chamber 15 is provided with upwardly tapering conical configuration open at top and bottom to receive a frustro-conical valve-member 16. Said chamber is provided with a closely fitting circular seat for said valve-member at its upper end, as at 17, and with a similar seat at its lower portion 18. Intermediate said seats the valve-body is formed with a passage 20 leading to a tapped boss 21 with which a pipe 22 communicates from a source of hot water supply under pressure and a passage 23 leading to a tapped boss 25 with which a pipe 26 communicates from a source of cold water supply under pressure. Said passages are on opposite sides of the chamber 15 and are separated by the member 16 by the contact portion 27 of the body. An outlet 28 in the valve body communicates with a delivery spout 30 from a passage 31 intermediate said passages 20 and 23. A vertically disposed web 32 with a divisional contact portion 33 separates the passage 31 from the hot water passage 20, and a similar web 35 having a divisional contact portion 36 separates passage 31 from the cold water passage 23.

The valve-member 16 is formed or provided with branched ports 37 and 38, respectively, communicating with the hot and cold water passages 20 and 23 and connect with a delivery port 40 leading into the discharge passage 31.

Figure 1:
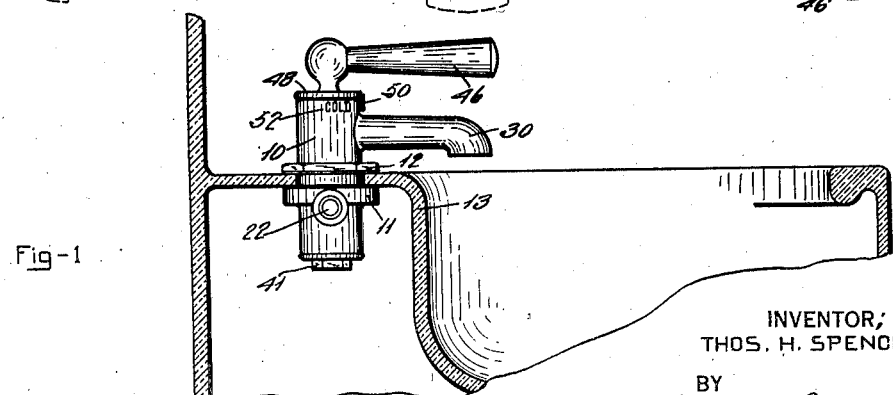

Said valve body is provided at the lower end of said chamber 15 with internal screw threads having a closure 41 chambered to support a coil spring 42 arranged to yieldingly support the valve-member 16, as by a flanged support 44 for a ball-bearing 43. The upper end of said valve member is provided with a squared stem 45 upon which is mounted a handle 46 secured thereon by screw 47. The handle is formed with a circular cap-flange 48 partially counter-sunk within the valve chamber which rotates with the valve-member to provide a closure and finish for the top of the valve-body and is formed with an index finger 50 which indicates to the user the relative position of the valve-member through reference to exterior markings in the valve body, as illustrated at 51 in Fig. 1, denoting " Hot " " Cold " " Temperate " and " Off " or such other indications as may be desired.

52 denotes a by-pass establishing fluid pressure connection between the chamber 15 above the valve-seat 18 and therebelow to maintain an equality of pressure above and below said lower seat and utilize the fluid pressure to assist the spring 42 in maintaining said valve member in effective seating position as well as to balance the pressures upon all sides and prevent uneven wear of the valve.

Figure 4:
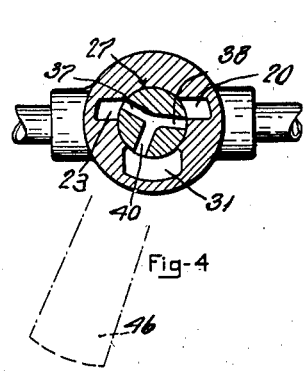
Figs. 3, 4 and 5 are cross sectional views of the faucet, illustrating several of the rotary portions of the valve member.
Figure 3:
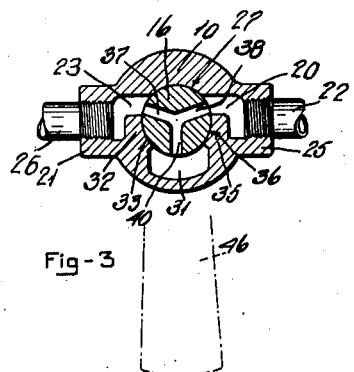
Figure 5:
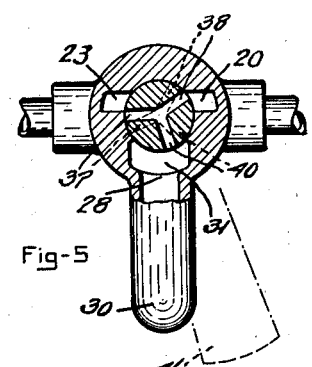

In Fig. 3 will be seen the rotary position of the valve member 16 to draw off both hot and cold water with the parts 37 and 38 both in communication with the passages 20 and 23, respectively. In Fig. 4 is illustrated the position of the valve when only cold water is delivered, and in Fig. 5 the position of delivery of hot water is shown in full lines, while in broken lines one of the shut-off positions of the valve is illustrated. It is obvious that intermediate positions to those shown will result in more or less hot or cold water being delivered through the communicating delivery port 40 and thence discharged through the spout 30.

It will be seen that the faucet is of simple construction and free from packing glands or cushion valve-surfaces and hence should be unusually free from leakage or repairs. The water pressures are balanced by the introduction of water under pressure from opposite sides of the rotary valve-member and the same pressure is introduced longitudinally of the valve whereby a close eveningly wearing fit at the valve seats is ensured without screw or other adjustments being necessary or desirable. It is to be understood that the valve seats and contact portions of the valve body with the valve member shall be ground joints or the equivalent therefor; and further that these and other portions of the invention may be departed from that are comprised within the spirit of the invention and the scope of the claims.

What I claim as my invention, is,

1. A faucet of the character described comprising a valve body having an upwardly tapering conical chamber open at top and bottom formed with a circular valve seat at its upper and lower portions, respectively, and lateral passages on opposite sides intermediate said seats communicating with sources of water supply, respectively, together with a delivery passage intermediate said lateral passages, said chamber having divisional contact portions between said passages, a frustro-conical valve-member formed with branched parts connecting with said passages, respectively, a handle closing one end of said valve chamber, a screw-threaded closure for the opposite end of said chamber, a spring interposed between said closure and the lower end of said valve member.

2. A faucet of the character described comprising a valve body having an upwardly tapering conical chamber open at its top and bottom ends and formed with a circular valve seat at its upper and lower ends, respectively, said body having communicative connections on opposite sides with sources of hot and cold water supply, respectively, with passages connecting the same with said chamber, intermediate said seats, said body having a delivery outlet with a passage connecting with said chamber intermediate said hot and cold water passages, a frustro-conical valve member seated in said chamber and provided with parts arranged to register with said passages, said body having a by-pass leading from said chamber intermediate said seats to below said valve member, a handle for said valve member closing one end of said chamber, a closure for the opposite end of said chamber, and a spring-pressed ball-bearing for the under side of said valve member.

THOMAS H. SPENCE.